(12) United States Patent
Kim

(10) Patent No.: US 10,875,424 B2
(45) Date of Patent: Dec. 29, 2020

(54) SEAT PUMPING DEVICE FOR VEHICLE

(71) Applicant: Hyundai Dymos Incorporated, Chungcheongnam-do (KR)

(72) Inventor: Won Kim, Gyeonggi-Do (KR)

(73) Assignee: Hyundai Dymos Incorporated, Chungcheongnam-do (KR)

(*) Notice: Subject to any disclaimer, the term of this patent is extended or adjusted under 35 U.S.C. 154(b) by 136 days.

(21) Appl. No.: 16/199,758

(22) Filed: Nov. 26, 2018

(65) Prior Publication Data

US 2019/0193599 A1 Jun. 27, 2019

(30) Foreign Application Priority Data

Dec. 26, 2017 (KR) .......................... 10-2017-0180222

(51) Int. Cl.
*B60N 2/16* (2006.01)

(52) U.S. Cl.
CPC .............. *B60N 2/168* (2013.01); *B60N 2/169* (2013.01)

(58) Field of Classification Search
CPC .......... B60N 2/168; B60N 2/169; B60N 2/02; B60N 2/167; F16D 41/00–22; F16D 43/00; F16D 43/02; F16D 43/20–208; F16D 45/00
See application file for complete search history.

(56) References Cited

U.S. PATENT DOCUMENTS

| 8,109,373 | B2* | 2/2012 | Paing | B60N 2/168 |
| | | | | 192/15 |
| 8,820,501 | B2* | 9/2014 | Hur | B60N 2/167 |
| | | | | 192/15 |
| 10,118,507 | B2* | 11/2018 | Chae | B60N 2/167 |
| 2011/0193391 | A1* | 8/2011 | Mitsuhashi | B60N 2/2252 |
| | | | | 297/354.1 |
| 2017/0096083 | A1* | 4/2017 | Lee | B60N 2/1635 |

FOREIGN PATENT DOCUMENTS

KR 10-1774341 B1 9/2017

* cited by examiner

*Primary Examiner* — Tinh Dang
(74) *Attorney, Agent, or Firm* — Mintz Levin Cohn Ferris Glovsky and Popeo, P.C.; Peter F. Corless

(57) ABSTRACT

Disclosed is a seat pumping device for a vehicle. The seat pumping device includes: a housing having a through hole formed therein; a clutch cam positioned on an inside of the housing and coupled such that a coupling protrusion protruding outwardly of the housing through the through hole is turnable relative to the housing; a lever bracket positioned on an outside of an upper surface of the housing so as to face the clutch cam with the housing interposed therebetween, the lever bracket being coupled to the coupling protrusion of the clutch cam to be turned integrally with the clutch cam; and a supporting portion protruding from one of the upper surface of the housing and a lower surface of the lever bracket toward a remaining one, the upper surface of the housing and the lower surface of the lever bracket facing each other, the supporting portion supporting the lever bracket and the housing so as to be spaced apart from each other at a regular interval.

13 Claims, 4 Drawing Sheets

(a)

(b)

(c)

(a)

(b)

(c)

SEAT PUMPING DEVICE FOR VEHICLE

CROSS REFERENCE TO RELATED APPLICATION

The present application claims priority to Korean Patent Application No. 10-2017-0180222, filed Dec. 26, 2017, which is incorporated herein by reference.

BACKGROUND OF THE INVENTION

Field of the Invention

The present invention relates generally to a seat pumping device for a vehicle and, more particularly, to a seat pumping device for a vehicle, the set pumping device being capable of reducing undesirable movement of components which occurs inside the device.

Description of the Related Art

As well known in the art, a seat lifting device for a vehicle denotes a device which is mounted to a seat to allow an occupant on the seat to manually adjust a height of the seat. Specifically explained, when the occupant on the seat operates a lever, which is mounted on a lateral side of a seat cushion, clockwise or counterclockwise, an operating force exerted on the lever by the occupant is transmitted to a link mechanism, causing the seat cushion to be moved upward or downward. Herein, the lifting device for a vehicle provided between the lever and the link mechanism transmits torque of the lever to the link mechanism.

To this end, as disclosed in Korean Patent No. 10-1774341, the seat lifting device for a vehicle includes: a lever bracket turned in conjunction with the lever; a return spring guide equipped with a return spring that provides a restoring force to the lever bracket; a drum-shaped housing mounted inside a seat cushion, the housing including a clutch device provided therein and secured to the lever bracket to transmit torque of the lever, and a brake device provided therein and blocking reverse input torque to maintain a height of the seat cushion; and a housing cover covering the housing.

FIGS. 1 to 2C are views showing a coupled state of the seat pumping device for a vehicle according to the related art, wherein FIG. 2A is a perspective view showing a clutch cam, FIG. 2B is a top view showing the lever bracket, and FIG. 2C is a side view showing a coupled state of the clutch cam and the lever bracket.

Referring to FIGS. 1 to 2C, a clutch cam 20 of a clutch device has multiple coupling protrusions 21 formed on a surface thereof, and a housing 10 has a through hole (not shown). The protrusions 21 pass through the housing to be inserted into assembly holes 31 formed in a lever bracket 30 such that the clutch cam 20 and the lever bracket 30 are integrally coupled to each other by welding or the like. This allows the clutch cam 20 and the lever bracket 30 to be integrally coupled to each other to turn together.

Furthermore, a return spring guide 40 equipped with a return spring 41 is provided between the lever bracket 30 and the housing 10. The return spring guide 40 has an assembly protrusion (not shown) protruding therefrom to be inserted into the housing 10, whereby the return spring guide 40 is secured to the housing 10 so as not to be turnable relative to the housing 10.

In other words, the clutch cam 20, the housing 10, the return spring guide 40, and the lever bracket 30 are arranged in order, and then the clutch cam 20 and the lever bracket 30 are welded together.

The seat pumping device for a vehicle according to the related art is problematic in that when the lever bracket 30 is turned by manipulation of turning a lever (not shown) in a state where the lever bracket 30 is in excessively close contact with an outer circumferential surface of the return spring guide 40, an excessive frictional force is generated between the lever bracket 30 and the outer circumferential surface of the return spring guide 40, resulting in a problem of deteriorating operational comfort of the lever (not shown).

In order to solve such a problem, multiple small embossments 22 are adapted to be provided inwardly of the coupling protrusions 21 of the clutch cam 20, such that when coupling the clutch cam 20 and the lever bracket 30 to each other, the lever bracket 39 and the return spring guide 40 are spaced apart from each other at a predetermined interval.

Furthermore, when an external force is transmitted into the seat pumping device for a vehicle, there may occur undesirable movement of internal components vertically and horizontally with respect to a plane normal to the turning axis of the components. In particular, the embossments 22 arranged at positions indicated by the dotted lines in FIG. 2B are circumferentially arranged along a circle spaced inwardly of a circle along which the coupling protrusions 21 formed on the clutch cam 20 are circumferentially arranged, such that the embossments 22 are formed integrally with the clutch cam 20. Accordingly, even though the embossments 22 are provided, when the clutch cam 20 is not fully secured in position, the undesirable movement of the clutch cam 20 having been occurred is transmitted to the lever bracket 30.

When the clutch cam 20 is not restrained against the undesirable movement, there is problem in that the undesirable movement of the clutch cam 20 is transmitted to the lever bracket 30, inevitably leading to undesirable movement of the lever (not shown) itself. Thus, minute movement of the components undesirably occurring inside the seat pumping device increases as it is transmitted to the long lever, causing thereby great inconvenience to the occupant.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an objective of the present invention is to provide a seat pumping device for a vehicle, the seat pumping device being capable of preventing a clearance between components inside the device, thus preventing undesirable horizontal movement of the components from occurring with respect to a turning axis direction of a lever.

In order to achieve the above objective, according to one aspect of the present invention, there is provided a seat pumping device for a vehicle, the seat pumping device including: a housing having a through hole formed therein; a clutch cam positioned on an inside of the housing and coupled such that a coupling protrusion protruding outwardly of the housing through the through hole is turnable relative to the housing; a lever bracket positioned on an outside of an upper surface of the housing so as to face the clutch cam with the housing interposed therebetween, the lever bracket being coupled to the coupling protrusion of the clutch cam to be turned integrally with the clutch cam; and a supporting portion protruding from one of the upper surface of the housing and a lower surface of the lever bracket toward a remaining one, the upper surface of the housing and the lower surface of the lever bracket facing each other, the supporting portion supporting the lever bracket and the housing so as to be spaced apart from each other at a regular interval.

Multiple supporting portions may be arranged at positions spaced apart from each other.

Each of the supporting portions may be configured such that a protruding end thereof is in point contact with either of the lever bracket and the housing.

The supporting portion may protrude from the upper surface of the housing toward the lower surface of the lever bracket, and may be configured such that an end thereof has a hemispherical shape to be in point contact with the lower surface of the lever bracket.

The supporting portion may protrude from the lower surface of the lever bracket toward the upper surface of the housing, and may be configured such that an end thereof has a hemispherical shape to be in point contact with the upper surface of the housing.

A part of the supporting portions may protrude from the upper surface of the housing toward the lower surface of the lever bracket while a remaining part may protrude from the lower surface of the lever bracket toward the upper surface of the housing.

Multiple supporting portions may be circumferentially arranged along a circle of which center coincides with a turning axis of the lever bracket, at positions spaced apart from each other.

The supporting portions may be arranged to be spaced apart from each other at angular intervals of 120 degrees.

The housing may have a limiting step protruding from an edge of the through hole toward a center of the through hole to limit turning of the coupling protrusion, and the supporting portion may be positioned on an upper surface of the limiting step.

The coupling protrusions of the clutch cam may be circumferentially arranged along a circle of which center coincides with a turning axis of the clutch cam, and the supporting portion may be circumferentially positioned on a circle larger in radius than the circle along which the coupling protrusions are circumferentially arranged.

The seat pumping device may further include a return spring guide secured to the housing on an outside of the housing, wherein the lever bracket may have a circular vertical flange protruding toward inside of the return spring guide.

The supporting portion may be positioned closely to an edge of the vertical flange.

The return spring guide may be coupled to the housing so as to be spaced apart from the lever bracket at a regular interval in a state where the lever bracket and the housing are coupled to each other.

According to the seat pumping device for a vehicle according to the present invention, it is possible to prevent the undesirable horizontal movement between the housing and the lever bracket, thus preventing the undesirable movement of the components occurring inside the device from being transmitted to the lever through the lever bracket.

Furthermore, the regular interval is defined between the lever bracket and the housing and between the lever bracket and the return spring guide, making it possible to achieve a reduction in the operating force exerted on the lever and to prevent breakage, leading to improved durability.

Furthermore, provision of small embossments at the clutch cam is not required, making it possible to simplify a working process, and facilitate easy formation of the coupling protrusions.

BRIEF DESCRIPTION OF THE DRAWINGS

The above and other objects, features and other advantages of the present invention will be more clearly understood from the following detailed description when taken in conjunction with the accompanying drawings, in which:

FIGS. 1 to 2C are views showing a coupled state of a seat pumping device for a vehicle according to the related art; and FIGS. 3A to 4 are views showing a seat pumping device for a vehicle according to an embodiment of the present invention.

DETAILED DESCRIPTION OF THE INVENTION

Figure 1:
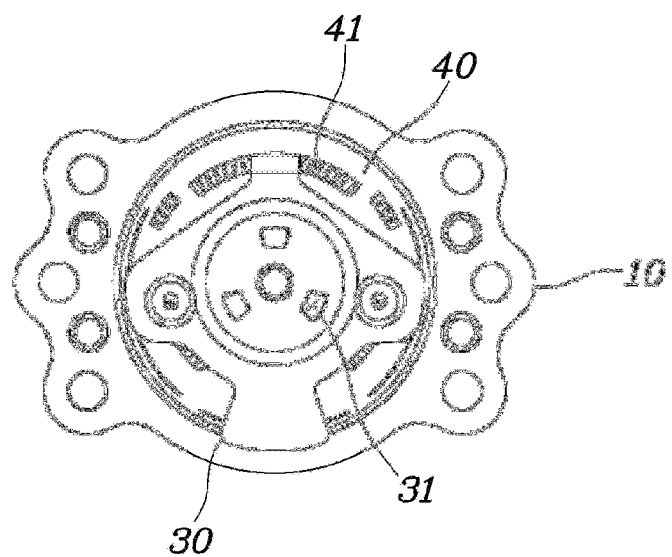
Figure 2:
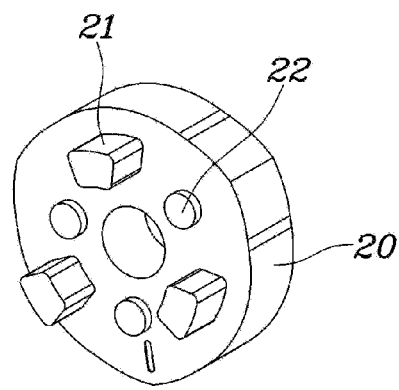
Figure 2:
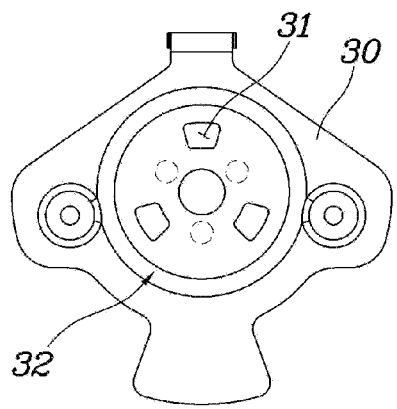
Figure 2:
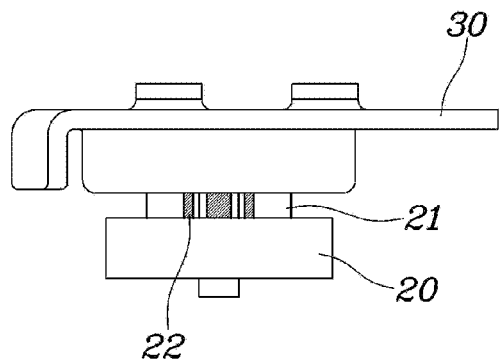

In the following description or specification, the structural or functional description specified to exemplary embodiments according to the concept of the present invention is intended to describe the exemplary embodiments, so it should be understood that the present invention may be variously embodied, without being limited to the exemplary embodiments.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

Figure 3:
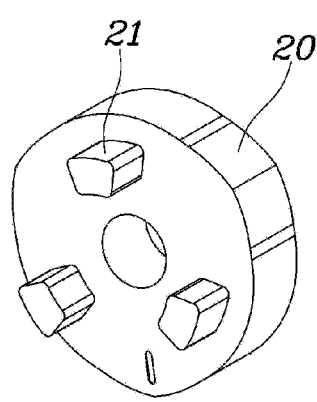
Figure 3:
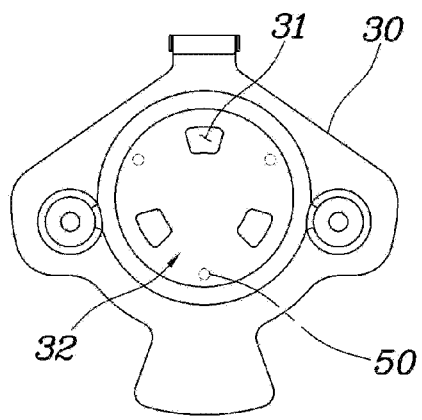
Figure 3:
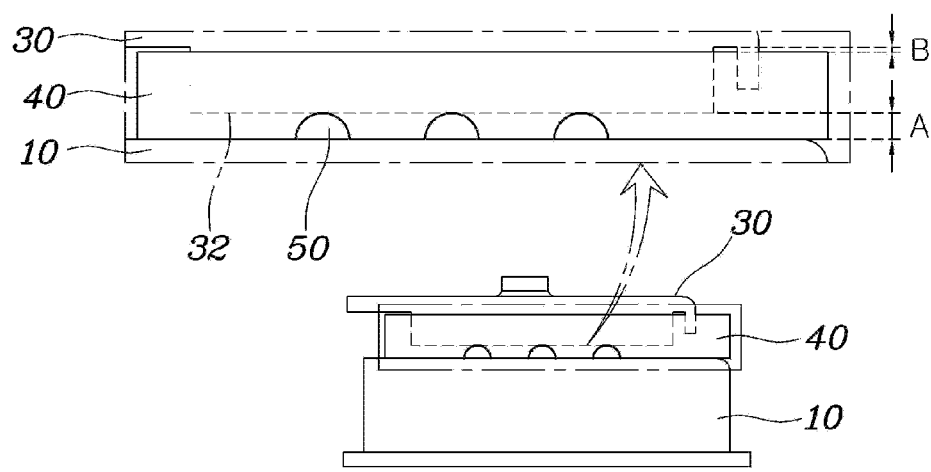
Figure 4:
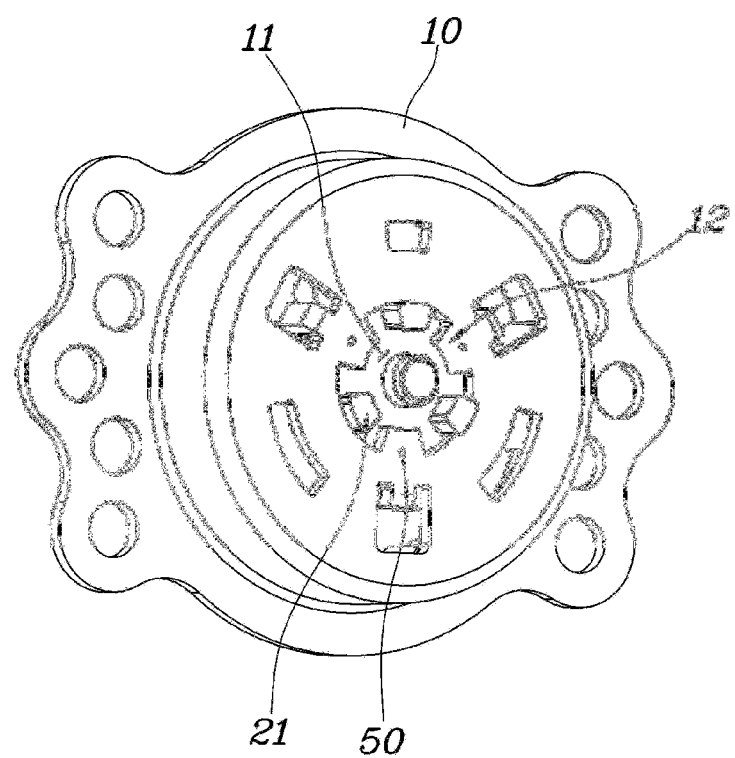

FIGS. 3A to 4 are views showing a seat pumping device for a vehicle according to an embodiment of the present invention FIGS. 3A, 3B, and 3C are a perspective view, a top view, and a side view respectively showing a clutch cam 20 according to the present invention; a lever bracket 30 according to the present invention; and a coupled state of a housing 10, a return spring guide 40, and a lever bracket 30 according to the present invention. FIG. 4 is a perspective view showing a coupled state of a clutch cam 20 and the housing 10 according to the embodiment of the present invention.

Referring to FIGS. 3A to 4, the seat pumping device for a vehicle according to the embodiment of the present invention includes: the housing 10 having a through hole 11 formed therein; the clutch cam 20 positioned on an inside of the housing 10 and coupled such that a coupling protrusion 21 protruding outwardly of the housing 10 through the through hole 11 is turnable relative to the housing 10; the lever bracket 30 positioned on an outside of an upper surface of the housing 10 so as to face the clutch cam 20 with the housing 10 interposed therebetween, the lever bracket being coupled to the coupling protrusion 21 of the clutch cam 20 to be turned integrally with the clutch cam 20; and a supporting portion 50 protruding from one of the upper surface of the housing 10 and a lower surface of the lever bracket 30 toward a remaining one, the upper surface of the housing and the lower surface of the lever bracket facing each other, the supporting portion supporting the lever bracket 30 and the housing 10 so as to be spaced apart from each other at a regular interval.

The housing 10 may be configured such that the through hole 11 is formed therein, the clutch cam 20 is positioned on the inside thereof, and the lever bracket 30 is positioned on the outside thereof. The housing 10 may be turnable relative to the clutch cam 20 and lever bracket 30 which turns integrally with each other.

The housing 10 may have a limiting step 12 protruding from an edge of the through hole 11 toward a center of the through hole 11 to limit turning of the coupling protrusion 21 such that the housing 10 is turnable relative to the clutch cam 20 and the lever bracket 30 only within a predetermined angle range.

The coupling protrusion 21 protruding from the clutch cam 20 protrudes from the inside of the housing 10 outwardly of the housing through the through hole 11. The coupling protrusion 21 may be coupled to the lever bracket 30. Specifically explained, the coupling protrusion 21 may be integrally coupled to the lever bracket 30 by welding or the like in a state of being inserted into the assembly hole 31 formed in the lever bracket 30. The clutch cam 20 may not have a small embossment (not shown) in the related art.

The lever bracket 30 may be positioned on the outside of the upper surface of the housing 10 so as to face the clutch cam 20 and may be coupled to the coupling protrusion 21 of the clutch cam 20 to be turned integrally therewith.

The clutch cam 20 may have multiple coupling protrusion 21 circumferentially arranged along a circle of which center coincides with a turning axis of the clutch cam 20 at positions spaced apart from each other.

The present invention may further include the return spring guide 40 secured to the housing 10 on the outside of the housing 10. The return spring guide 40 may be equipped with a return spring provided therein. The lever bracket 30 may have a circular protruding vertical flange 32, and the vertical flange 32 may protrude toward inside of the return spring guide 40. In other words, the return spring guide 40 may be shaped to surround the protruding vertical flange 32 of the lever bracket 30.

The supporting portion 50 may be formed to support the lever bracket 30 and the housing 10 at a position between the upper surface of the housing 10 and the lower surface of the lever bracket 30 which face each other, such that the upper surface of the housing 10 and the lower surface of the lever bracket 30 are spaced apart from each other at the regular interval. The support portion 50 protrudes from the upper surface of the housing 10 to the lower surface of the lever bracket 30 in the embodiment of the present invention, but may protrude from the lower surface of the lever bracket 30 to the upper surface of the housing 10.

Alternatively, multiple supporting portions 50 may be arranged at positions spaced apart from each other, such that a part thereof protrudes from upper surface of the housing 10 to the lower surface of the lever bracket 30 while a remaining part thereof protrudes from the lower surface of the lever bracket 30 to the upper surface of the housing 10.

Each of the supporting portions 50 may be configured such that a protruding end thereof is in point contact with either of the lever bracket 30 and the housing 10. Specifically explained, the end of the supporting portion 50 may have a hemispherical shape so as to be in point contact with either of the lower surface of the lever bracket 30 and the upper surface of the housing 10. The supporting portion 50 may be formed to protrude in a cylindrical shape having the hemispherical-shaped end or may be formed in a polygonal pyramid shape so as to be in point contact therewith.

Thus, it is possible to minimize a friction area between the lever bracket 30 and the housing 10 and thus to reduce an operating force exerted on a lever, leading to improved operational quality.

Multiple supporting portions 50 may be circumferentially arranged along a circle of which center coincides with a turning axis of the lever bracket 30, at positions spaced apart from each other. In particular, the supporting portions 50 may be circumferentially arranged along the circle at angular intervals of 120 degrees such that three supporting portions 51 are arranged at equal angular intervals. Accordingly, it is possible to stably support between the lever bracket 30 and the housing 10 without being biased to either side thereof in an unbalanced manner.

Furthermore, the supporting portion 50 may be positioned on the limiting step 12 protruding from the edge of the through hole 11 toward the center of the through hole 11 to limit turning of the coupling protrusion 21. The limiting step 12 may be formed in the same number as the number of coupling protrusions 21 and the supporting portion 50 may be positioned on an upper surface of each limiting step 12. The supporting portions 50 are positioned on the upper surfaces of the limiting steps 12 that protrude from the through hole 11 spaced apart from each other as much as possible, thus enabling stable support.

As shown in FIG. 3B, the supporting portions 50 may be circumferentially arranged along a circle larger in radius than the circle along which the coupling protrusion 21 are circumferentially arranged. The coupling protrusions 21 of the clutch cam 20 are circumferentially arranged along the circle of which center coincides with the turning axis of the clutch cam 20, and the supporting portions 50 are circumferentially arranged along the circle larger in radius than the circle along which the coupling protrusion 21 are circumferentially arranged.

Alternatively, the supporting portions 50 may be arranged as closely as possible to an edge of the circular vertical flange 32 of the lever bracket 30. Thus, the supporting portions 50 are arranged at the outermost side, enabling more stable support without being biased in one direction.

As shown in FIG. 3C, the supporting portions 50 may support between the lever bracket 30 and the housing 10 such that an interval A between the lever bracket 30 and the housing 10 is approximately 0.5 mm.

Furthermore, the return spring guide 40 may be positioned between the lever bracket 30 and the housing 10 and may be coupled to the housing 10 so as to surround the vertical flange 32 of the lever bracket 30. The return spring guide 40 may be coupled to the housing 10 to be spaced apart from the lever bracket 30 at an interval B in a state where the lever bracket 30 and the housing 10 are coupled to each other.

In other words, the return spring guide 40 may be coupled to the housing 10 such that the interval B between the return spring guide 40 and the lever bracket 30 is maintained at approximately 0.4 mm in a state where the return spring guide 40 and the lever bracket 30 are coupled to the housing 10.

Thus, the housing 10 and the lever bracket 30 are spaced apart from each other by the supporting portions 50 being in point contact therewith while the return spring guide 40 and the lever bracket 30 are spaced apart from each other, making it possible to prevent interference between turning components from occurring. This can lead to a reduction in the operating force exerted on the lever, leading to improved operational quality.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A seat pumping device for a vehicle, the seat pumping device comprising:
a housing having a through hole formed therein;
a clutch cam positioned on an inside of the housing and coupled such that a coupling protrusion protruding outwardly of the housing through the through hole is turnable relative to the housing;
a lever bracket positioned on an outside of an upper surface of the housing so as to face the clutch cam with the housing interposed therebetween, the lever bracket being coupled to the coupling protrusion of the clutch cam to be turned integrally with the clutch cam; and
a supporting portion protruding from the upper surface of the housing or a lower surface of the lever bracket toward a remaining one among the upper surface of the housing and the lower surface of the lever bracket, the upper surface of the housing and the lower surface of the lever bracket facing each other, the supporting portion supporting the lever bracket and the housing such that the lever bracket and the housing are spaced apart from each other at a predetermined distance.

2. The seat pumping device of claim 1, wherein the supporting portion further includes multiple supporting portions supportively arranged at positions spaced apart from each other.

3. The seat pumping device of claim 2, wherein each of the multiple supporting portions is configured such that a protruding end thereof is in point contact with either of the lever bracket and the housing.

4. The seat pumping device of claim 1, wherein the supporting portion protrudes from the upper surface of the housing toward the lower surface of the lever bracket, and is configured such that an end thereof has a hemispherical shape to be in point contact with the lower surface of the lever bracket.

5. The seat pumping device of claim 1, wherein the supporting portion protrudes from the lower surface of the lever bracket toward the upper surface of the housing, and is configured such that an end thereof has a hemispherical shape to be in point contact with the upper surface of the housing.

6. The seat pumping device of claim 2, wherein a part of the multiple supporting portions protrudes from the upper surface of the housing toward the lower surface of the lever bracket while a remaining part protrudes from the lower surface of the lever bracket toward the upper surface of the housing.

7. The seat pumping device of claim 1, wherein the supporting portion further includes multiple supporting portions circumferentially arranged along a circle of which a center coincides with a turning axis of the lever bracket, the multiple supporting portions being arranged at positions spaced apart from each other.

8. The seat pumping device of claim 7, wherein the multiple supporting portions are arranged to be spaced apart from each other at angular intervals of 120 degrees.

9. The seat pumping device of claim 1, wherein the housing has a limiting step protruding from an edge of the through hole toward a center of the through hole to limit turning of the coupling protrusion, and the supporting portion is positioned on an upper surface of the limiting step.

10. The seat pumping device of claim 1, wherein the coupling protrusions of the clutch cam are circumferentially arranged along a circle of which center coincides with a turning axis of the clutch cam, and the supporting portion is positioned circumferentially on a circle larger in radius than the circle along which the coupling protrusions are circumferentially arranged.

11. The seat pumping device of claim 1, further comprising:
a return spring guide secured to the housing on an outside of the housing,
wherein the lever bracket has a circular vertical flange protruding toward inside of the return spring guide.

12. The seat pumping device of claim 11, wherein the supporting portion is positioned closely to an edge of the vertical flange.

13. The seat pumping device of claim 11, wherein the return spring guide is coupled to the housing such that the housing is spaced apart from the lever bracket at a predetermined distance in a state where the lever bracket and the housing are coupled to each other.

\* \* \* \* \*